US010013692B2

(12) United States Patent
Hubert et al.

(10) Patent No.: US 10,013,692 B2
(45) Date of Patent: Jul. 3, 2018

(54) SYSTEMS AND METHODS FOR AUTHORIZING TRANSACTIONS VIA A DIGITAL DEVICE

(71) Applicant: Cryptocode, Inc., Santa Barbara, CA (US)

(72) Inventors: Matt Hubert, San Francisco, CA (US); Cody Walker, Mountain View, CA (US); Carl Minden, Mountain View, CA (US); Ghaith Hammouri, Worcester, MA (US); Cetin Kaya Koc, Santa Barbara, CA (US)

(73) Assignee: Cryptocode, Inc., Santa Barbara, CA (US)

( * ) Notice: Subject to any disclaimer, the term of this patent is extended or adjusted under 35 U.S.C. 154(b) by 909 days.

(21) Appl. No.: 13/674,291

(22) Filed: Nov. 12, 2012

(65) Prior Publication Data

US 2013/0124422 A1 May 16, 2013

Related U.S. Application Data

(60) Provisional application No. 61/558,364, filed on Nov. 10, 2011.

(51) Int. Cl.
*G06Q 20/38* (2012.01)
*H04L 9/32* (2006.01)
*G06Q 20/40* (2012.01)

(52) U.S. Cl.
CPC ........ *G06Q 20/3827* (2013.01); *G06Q 20/40* (2013.01); *G06Q 20/40975* (2013.01); *H04L 9/32* (2013.01); *H04L 9/3271* (2013.01)

(58) Field of Classification Search
CPC ....... G07F 7/10; G07F 7/1016; G06Q 20/401; G06Q 20/4012; G06Q 20/4014; G06Q 20/382; G06Q 20/3829; G06Q 20/3827; G06Q 20/40975; H04L 9/32; H04L 9/3271
USPC .................. 705/71, 64, 72, 75, 44
See application file for complete search history.

(56) References Cited

U.S. PATENT DOCUMENTS

| 7,635,084 | B2* | 12/2009 | Wang | ................ G06Q 20/00 235/375 |
| 8,321,683 | B2* | 11/2012 | Hsu | .................. G05B 15/02 705/72 |
| 8,401,968 | B1* | 3/2013 | Schattauer | ......... G06Q 20/3255 235/380 |
| 8,712,453 | B2* | 4/2014 | Geil | ..................... H04L 51/38 455/411 |
| 8,966,272 | B2* | 2/2015 | Kiel | ..................... G06F 21/52 713/176 |

(Continued)

*Primary Examiner* — Mamon Obeid
*Assistant Examiner* — Edgar R Martinez-Hernandez
(74) *Attorney, Agent, or Firm* — Kilpatrick Townsend & Stockton LLP

(57) ABSTRACT

In various embodiments, transactions initiated by or on behalf of users between client systems and transaction systems are sent to authorization systems for approval. An authorization system contacts one or more registered devices for approval from a user of the registered devices for the transactions initiated by or on behalf of the users that are being handled by the transaction systems. A registered device sends an approval or denial based on user input. The authorization server then sends the approval or denial to a transaction system to complete a transaction.

21 Claims, 15 Drawing Sheets

(56) References Cited

U.S. PATENT DOCUMENTS

| | | | | |
|---|---|---|---|---|
| 2002/0175211 A1* | 11/2002 | Dominquez | G06K 17/0022 | 235/492 |
| 2003/0196087 A1* | 10/2003 | Stringer | G06F 21/6209 | 713/171 |
| 2004/0187018 A1* | 9/2004 | Owen | G06F 21/31 | 713/184 |
| 2005/0120203 A1* | 6/2005 | Yeh | H04L 63/062 | 713/156 |
| 2006/0017970 A1* | 1/2006 | Park | G06F 3/1222 | 358/1.15 |
| 2006/0098842 A1* | 5/2006 | Levine | G06Q 10/08 | 382/101 |
| 2006/0131385 A1* | 6/2006 | Kim | G06Q 20/24 | 235/379 |
| 2007/0276765 A1* | 11/2007 | Hazel | G06F 21/72 | 705/71 |
| 2008/0041936 A1* | 2/2008 | Vawter | G06Q 20/00 | 235/380 |
| 2008/0052499 A1* | 2/2008 | Koc | G06F 9/3806 | 712/238 |
| 2009/0119221 A1* | 5/2009 | Weston | G06Q 20/382 | 705/76 |
| 2009/0144162 A1* | 6/2009 | Milne | G06O 20/1085 | 705/17 |
| 2009/0228707 A1* | 9/2009 | Linsky | G06F 21/31 | 713/171 |
| 2010/0321739 A1* | 12/2010 | Amagai | G06T 3/00 | 358/3.28 |
| 2011/0035240 A1* | 2/2011 | Joao | G06Q 20/10 | 705/4 |
| 2011/0126295 A1* | 5/2011 | Resch | G06F 21/64 | 726/27 |
| 2011/0137748 A1* | 6/2011 | Baher | G06Q 20/12 | 705/26.41 |
| 2011/0213711 A1* | 9/2011 | Skinner | G06F 21/43 | 705/71 |
| 2011/0295753 A1* | 12/2011 | Reno | G06Q 20/40 | 705/72 |

* cited by examiner

SYSTEMS AND METHODS FOR AUTHORIZING TRANSACTIONS VIA A DIGITAL DEVICE

CROSS-REFERENCES TO RELATED APPLICATIONS

This application claims the benefit of U.S. Provisional Patent Application No. 61/558,364, filed Nov. 10, 2011 and entitled "Systems And Methods For Authorizing Transactions Via A Digital Device", the contents of which are hereby incorporated by reference in its entirety for all purposes.

BACKGROUND OF THE INVENTION

The present invention relates generally to systems and methods for authorizing transactions in a network environment, and more particularly to systems and methods for authorizing transactions via a remote digital device.

Accordingly, what is desired is to solve problems relating to the authorization of an individual or other entity to perform secure actions occurring in a network environment, some of which may be discussed herein. Additionally, what is desired is to reduce drawbacks relating to the trust of a third party in providing authorization responses to a requesting entity, as well as the requirement of user intervention beyond binary input in response to such requests, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, transactions initiated by or on behalf of users between client systems and transaction systems are sent to authorization systems for approval. An authorization system contacts one or more registered devices for approval from a user of the registered devices for the transactions initiated by or on behalf of the users that are being handled by the transaction systems. A registered device sends an approval or denial based on user input. The authorization server then sends the approval or denial to a transaction system to complete a transaction.

In one embodiment, a computer-implemented method for providing transaction authorization includes receiving a request from one or more transaction systems to approve a transaction being processed by the one or more transaction systems. The request to approve the transaction includes at least a nonce. The request to approve the transaction may include additional information, such as transaction data, user data, or the like. Device information is then determined for at least one party to the transaction designating one or more devices at which the at least one party receives authorization requests. A public key generated on at least one of the one or more of the devices at which the at least one party receives authorization requests is communicated to the one or more transaction systems such that the one or more transaction systems verify cryptographic validity of the public key using a hash. An authorization request is also communicated to at least one of the one or more devices at which the at least one party receives authorization requests based on the request to approve the transaction. A response to the authorization request is communicated to the one or more transaction systems based on a verification that the response to the authorization request includes the nonce and authorization information both cryptographically signed by a private key associated with the at least one of the one or more devices at which the at least one party receives authorization requests.

In some embodiments, the transaction may be a login transaction wherein a user supplies a username and password to the one or more transaction systems. In further embodiments, the transaction may be a financial transaction such as where a credit card or debit card of a user is swiped in a processing terminal of a merchant, where near-field communication (NFC) is used to allow a processing terminal of a merchant to access bank information of a user, an online financial transaction, or the like.

In one aspect, the public key is verified on the one or more transaction systems in response to a comparison between a first hash of the public key and a second hash of the public key. The first hash is generated on the at least one of the one or more devices at which the at least one party receives authorization requests, for example, during an enrolment process. The second hash of the public key is generated on the one or more transaction systems.

In one embodiment, an authorization system may receive the response to the authorization request and perform the verification that the response to the authorization request includes the nonce and authorization information both cryptographically signed by a private key associated with the at least one of the one or more devices at which the at least one party receives authorization requests.

In further embodiments, an authorization system may receive the response to the authorization request in response to a comparison of a first visual representation of the nonce displayed at the at least one of the one or more devices at which the at least one party receives authorization requests with a second visual representation of the nonce. An authorization system may receive the response to the authorization request in response to the at least one of the one or more devices at which the at least one party receives authorization requests receiving a personal identification number (PIN) enabling the at least one of the one or more devices at which the at least one party receives authorization requests to generate authorization information.

In one embodiment, a non-transitory computer-readable medium storing computer-executable code for providing transaction authorization includes code for receiving a request from one or more transaction systems to approve a transaction being processed by the one or more transaction systems, the request to approve the transaction including at least a nonce, code for determining device information for at least one party to the transaction designating one or more devices at which the at least one party receives authorization requests, code for communicating a public key generated on at least one of the one or more of the devices at which the at least one party receives authorization requests to the one or more transaction systems such that the one or more transaction systems verify cryptographic validity of the public key using a hash, code for communicating an authorization request to at least one of the one or more devices at which the at least one party receives authorization requests based on the request to approve the transaction, and code for communicating a response to the authorization request to the one or more transaction systems based on a verification that the response to the authorization request includes the nonce and authorization information both cryptographically signed by a private key associated with the at least one of the one or more devices at which the at least one party receives authorization requests.

In one embodiment, method for authorizing transactions includes receiving transaction information associated with a transaction. An instruction to one or more authorization systems is generated requesting approval of the transaction such that the one or more authorization systems request authorization information from one or more devices at which at least one party to the transaction receives authorization requests. The instruction including at least a random nonce. A response is received from at least one of the one or more devices at which the at least one party receives authorization requests to generate authorization information. Information is then generated indicative of whether to approve or deny the transaction in response to verifying the cryptographic validity of a public key associated with the at least one of the one or more devices using a hash.

In some embodiments, a system for providing transaction authorization includes one or more computer systems associated with an authorization service and one or more computer systems associated with a transaction service. The authorization service receives a request from the transaction service to approve a transaction being processed by the transaction service. The request to approve the transaction including transaction data. The authorization service retrieves information from a database for at least one party to the transaction. The information designates one or more devices at which the at least one party receives authorization requests. A public key generated on at least one of the one or more of the devices at which the at least one party receives authorization requests is communicated to the transaction service such that the transaction service is able to verify cryptographic validity of the public key using a hash. An authorization request is communicated to at least one of the one or more devices at which the at least one party receives authorization requests based on the request to approve the transaction. A response to the authorization request is communicated to the transaction service based on a verification that the response to the authorization request includes a nonce and authorization information both cryptographically signed by a private key associated with the at least one of the one or more devices at which the at least one party receives authorization requests.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference might be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

The present invention relates generally to systems and methods for authorizing transactions in a network environment, and more particularly to systems and methods for authorizing transactions via a remote digital device.

In various embodiments, transactions initiated by or on behalf of users between client systems and transaction systems are sent to authorization systems for approval. An authorization system contacts one or more registered devices for approval from a user of the registered devices for the transactions initiated by or on behalf of the users that are being handled by the transaction systems. A registered device sends an approval or denial based on user input. The authorization server then sends the approval or denial to a transaction system to complete a transaction.

Figure 1:
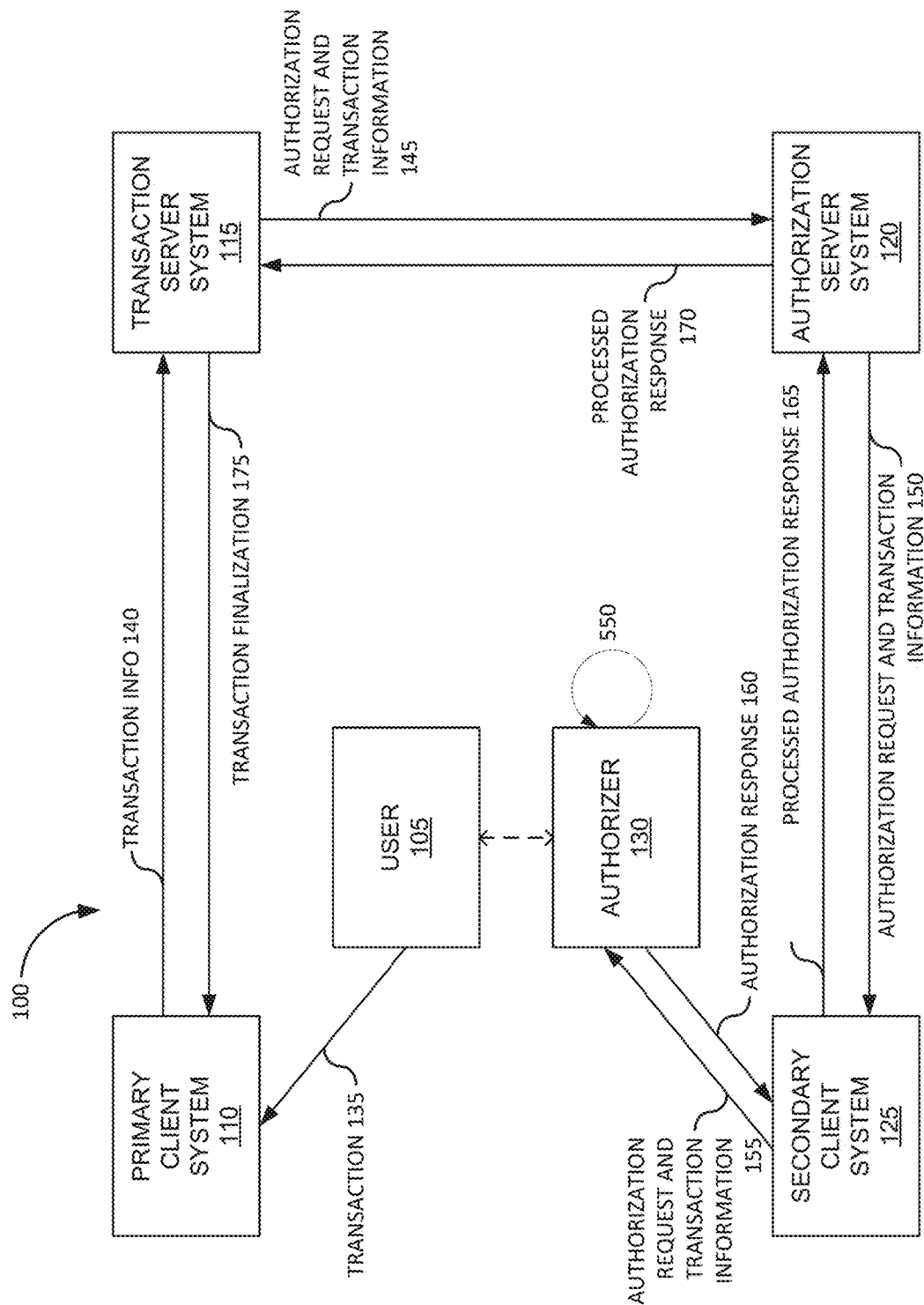
FIG. 1 is a block diagram of a system for authorizing transactions via a digital device in one embodiment.

FIG. 1 is a block diagram of system 100 for authorizing transactions via a digital device in one embodiment. In this example, system 100 includes user 105, primary client system 110, transaction server system 115, authorization server system 120, secondary client system 125, and authorizer 130.

User 105 is representative of one or more human users, automated processes (e.g., a process executing on a computer system), workflows (notwithstanding whether a workflow incorporates one or more manual or automated steps), or the like. User 105 may initiate one or more transactions with transaction server system 115 in a variety of ways and using a variety of mechanisms, some of which are well known in the art. User 105 interacts with primary client system 110 to initiate one or more transactions.

Primary client system 110 is representative of a digital device used by user 105. Primary client system 110 is configured to process transactions, such as initiating a transaction, requesting that a transaction be initiated, processing transaction data, finalizing a transaction, or the like. Primary client system 110 may include hardware and/or software elements configured to exchange data with transaction server system 115. Some examples of primary client system 110 include personal computers, laptops, tablets, smartphones and other mobile communication devices, such as the IPHONE® manufactured by Apple, Inc. of Cupertino Calif., a variety of digital media devices, such as the IPOD® and IPOD TOUCH® manufactured by Apple, Inc. of Cupertino Calif., and a variety of consumer electronic devices, such as television sets, set-top boxes, DVD/Blu-ray players, and other home theater equipment.

Transaction server system 115 is representative of one or more elements configured to process transactions. Transaction server system 115 may include hardware and/or software elements configured to receive transaction information from one or more requestors and process a set of transaction based on the transaction information to attempt to finalize each transaction in the set of transactions. For example, transaction server system 115 may include one or more computer systems configured to process credit card, debit card, or other merchant transactions.

Authorization server system 120 is representative of one or more elements configured to authorize transactions. Authorization server system 120 may include hardware and/or software elements configured to receive authorization requests for pending transactions and generate authorizations for the pending transactions.

In various embodiments, a transaction may be authorized via secondary client system 125. Secondary client system 125 is representative of a digital device used by authorization server system 120 to authorize a transaction. Secondary client system 125 may include hardware and/or software elements configured to exchange data with authorization server system 120. Some examples of secondary client system 125 include personal computers, laptops, tablets, smartphones and other mobile communication devices, such as the IPHONE® manufactured by Apple, Inc. of Cupertino Calif., a variety of digital media devices, such as the IPOD® and IPOD TOUCH® manufactured by Apple, Inc. of Cupertino Calif., and a variety of consumer electronic devices, such as television sets, set-top boxes, DVD/Blu-ray players, and other home theater equipment.

Authorizer 130 is representative of one or more human users, automated processes (e.g., a process executing on a computer system), workflows (notwithstanding whether a workflow incorporates one or more manual or automated steps), or the like. Authorizer 130 may authorize one or more transactions pending with transaction server system 115 through authorization server system 120. In some embodiments, authorizer 130 is the same entity as user 105 (as represented by the dashed line connecting the two).

In one example of operation of system 100, a transaction can be processed through primary client system 110 embodied as a personal computer connected to the Internet and running a web browser. Once transaction 135 is processed using primary client system 110, transaction information 140 is sent to transaction server system 115. Transaction server system 115 may attempt to authorize transaction 135 as using one or more means as described below. In general, transaction information 140 includes information associated with transaction 135. Some examples of the information included in transaction information 140 may include various information about a transaction including the identity of the transaction originator, who can be thought of as the user requesting authorization to perform the action.

To authorize transaction 135, transaction server system 115 sends authorization request and transaction information 145 to authorization server system 120. Authorization request and transaction information 145 may include some or all of transaction information 140 in addition to other extra information that may be required or utilized by authorization server system 120.

In one embodiment, authorization server system 120 retrieves previously stored information, such as information including the identity and/or address of secondary client system 125. Secondary client system 125 may be directly associated with the transaction originator in some embodiments (e.g., user 105), but also may be controlled and/or operated by a second user (e.g., authorizer 130) in charge of authorizing the transaction and who is different from the transaction originator. For example, secondary client system 125 may be embodied as the transaction originator's mobile phone or the mobile phone of a manager who will have the authority to authorize the transaction.

Once authorization server system 120 identifies secondary client system 125, authorization server system 120 sends authorization request and transaction information 150 to secondary client system 125. Authorization request and transaction information 150 may include some or all of authorization request and transaction information 145 in addition to other extra information that may be required or utilized by secondary client system 125. Secondary client system 125 may output or display authorization request and transaction information 155 to authorizer 130 which may include some of Authorization request and transaction information 150 along with other authorization information.

Authorizer 130 (which may or may not be the transaction originator) utilizes secondary client system 125 to respond to an authorization request from authorization server system 120 with authorization response 160 sent to the secondary client. Secondary client system 125 processes authorization response 160 and sends processed authorization response 165 to authorization server system 120. Authorization server system 120 then processes authorization response 165 and sends processed authorization response 170 to transaction server system 115.

Transaction server system 115 then processes authorization response 170. Transaction server system 115 may check the authenticity of authorization response 170 to ensure that authorization response 170 came from secondary client system 125. Transaction server system 115 may send primary client system 110 transaction finalization 175 (which may include processed authorization response 165) and complete the transaction accordingly.

In one embodiment, primary and secondary client systems 110 and 125 may be two devices that are associated with the same user or with different users. One device may be used to originate the transaction and another device may be used to authorize the transaction.

In one aspect, using an authorization process as described above allows transactions to be authorized through a single interaction, such as a click of a button.

In another aspect, a transaction authority may obtain transaction authorizations without entrusting all security to a central server. Although the authorization server may connect the transaction server with the secondary clients, attempts to tamper with the information sent by the secondary client can be detected by the transaction server by checking a cryptographic signature of the sent information as discussed below. As will be explained in one of the embodiments of this invention, the public key for the used signature can be sent in a secure way from the secondary client to the transaction server. Using the continuous connectivity of various systems, including mobile devices and datacenters, real-time secure authorization for transactions may be performed with less effort.

In various embodiments, in order to provide real-time secure authorization, secondary client system 125 registers or otherwise enrolls with authorization server system 120 as a device intended to receive authorization requests from authorization server system 120. For example, secondary client system 125 may go through an enrollment process conveniently provided through a web page hosted by authorization server system 120, a mobile app in communication with authorization server system 120, and/or other software executing on secondary client system 125 before being registered to authorize transactions via authorization server system 120.

Enrollment

In one embodiment, secondary client system 125 utilizes a cryptographic key pair and sends the public key to register with or otherwise enroll with authorization server system 120 to authorize transactions processed by transaction server system 115. Secondary client system 125 generates a hash of the public key using one or more of a verity of hashing algorithms and displays the hash of the public key allowing a user to interact with a website hosted by transaction server system 115, a mobile app in communication with transaction server system 115, and/or other software executing on secondary client system 125 to enable transaction server system 115 to recognize authorization responses secondary client system 125. For example, secondary client system 125 may display the hash of the public key and request that a user of secondary client system 125 submit the hash to transaction server system 115 using a website associated with transaction server system 115.

Figure 2:
FIG. 2 is an illustration of a digital device displaying a hash of a public key to be used to register the digital device for use in the system of FIG. 1 in one embodiment.

FIG. 2 is an illustration of digital device 200 displaying a hash of a public key to be used to register digital device 200 for use in system 100 of FIG. 1 in one embodiment. In this example, digital device 200 is embodied as a mobile phone acting as secondary client system 125. Preferably, secondary client system 125 utilizes a truncated base 32 encoded key stretch hash, such as described in the standard of RSA PKCS5 PBKDF2. In some embodiments, one or more of a variety of hashing algorithms are used to generate a hash of a public key in a public and private cryptographic key pair associated with digital device 200. Some examples of cryptographic hashing algorithms include GOST, HAVAL, MD2, MD4, MD5, PANAMA, RadioGatún, RIPEMD, RIPEMD-128/256, RIPEMD-160, RIPEMD-320, SHA-0, SHA-1, SHA-256/224, SHA-512/384, SHA-3, Tiger(2)-192/160/128, WHIRLPOOL, and the like. The hash algorithm may be chosen, in some embodiments, for its ability to create hashes that reduce collisions while also being readily transferred by a user of digital device 200 to transaction server system 115 using a website, mobile app, or the like.

Figure 3:
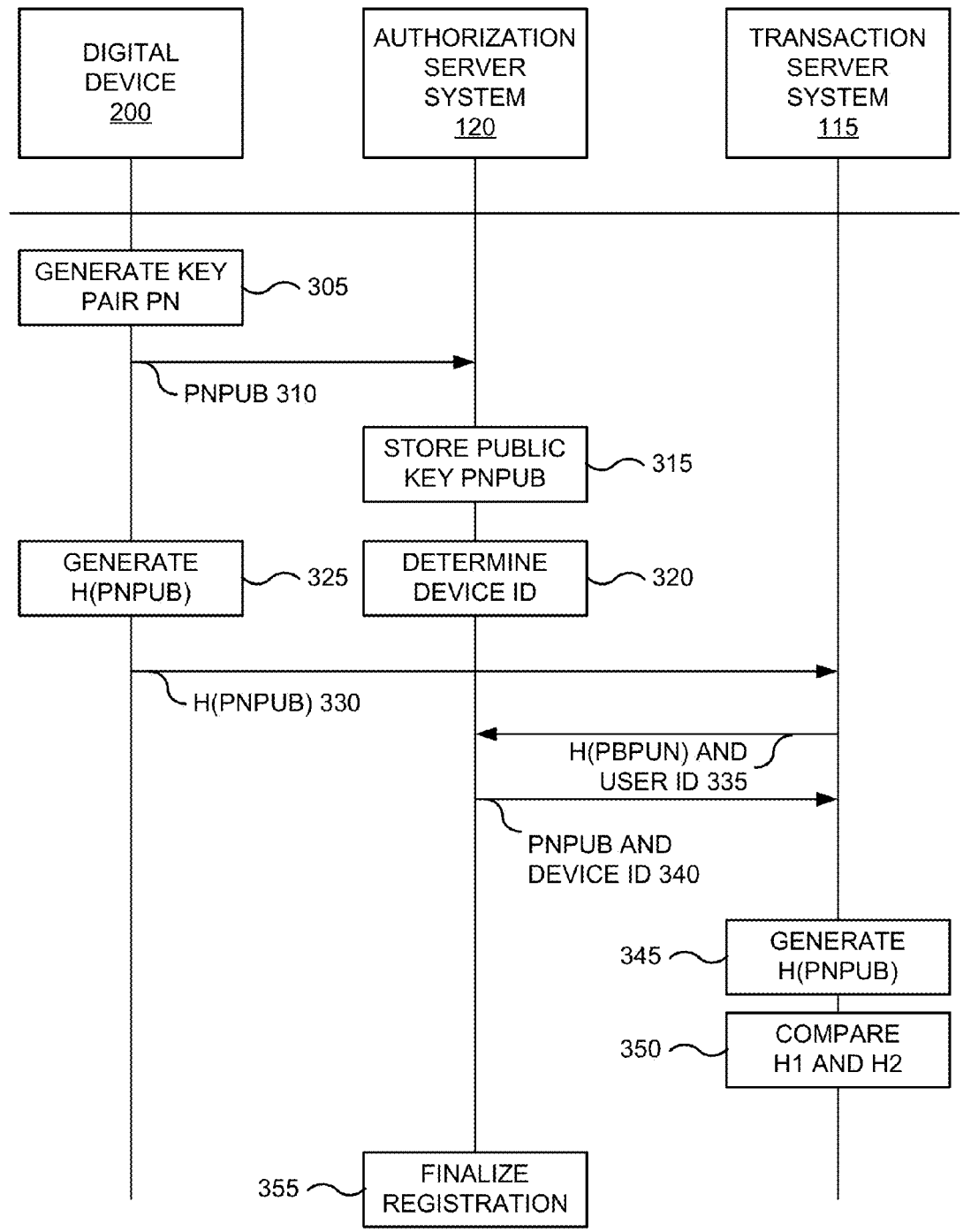
FIG. 3 is a message sequence chart depicting an enrollment process of the digital device of FIG. 2 for authorizing transactions in one embodiment.

FIG. 3 is a message sequence chart depicting an enrollment process of device 200 for authorizing transactions in one embodiment. While some processing blocks and the communication of certain messages are illustrated as occurring before or after others in FIG. 3, it should be understood that unless otherwise specified as having such a dependency processing blocks and the communication of messages can occur either in parallel, in series, or in a combination thereof.

In this example, as part of the enrollment process in step 305, digital device 200 generates a public and private cryptographic key pair Pn. Preferably, n is unique to each registered device and Pn is generated using a 2048 bit RSA algorithm or other cryptographically stronger process. Some examples of well-regarded asymmetric key techniques for varied purposes include Diffie-Hellman key exchange protocol, DSS (Digital Signature Standard), which incorporates the Digital Signature Algorithm, ElGamal, various elliptic curve techniques, various password-authenticated key agreement techniques, Paillier cryptosystem, RSA encryption algorithm, and Cramer-Shoup cryptosystem. Digital device 200 then sends the public key portion PnPUB 310 to authorization server 120.

In step 315, authorization server system 120 stores the public key portion PnPUB 310. Optionally, authorization server system 120 may receive from digital device 200 a hash of the public key portion PnPUB 310, referred to as H(PnPUB). Alternatively, authorization server system 120 may compute H(PnPUB) from PnPUB 310. Authorization server system 120 may store or otherwise cache PnPUB 310 and/or H(PnPUB) for a predetermined amount of time otherwise allowing the information to expire without the occurrence of one or more predetermined events or triggers.

In step 320, authorization server 120 determines a device identifier (e.g., device ID) for digital device 200. The device identifier may include a unique identifier assigned by authorization server system 120 that refers to an account, a user, an organization and/or users thereof, and/or a device or set of devices associated therewith, or the like. In some embodiments, authorization server 120 may receive the device identifier from digital device 200. The device identifier may include a name supplied by a user, information specific to digital device 200, or the like. For example, authorization server system 120 may receive a combination of user information associated with a user and device information associated with digital device 200 that forms a unique or semi-unique device identifier. In some embodiments, authorization server system 120 may generate a cryptographically unique number or monotonically increasing integer to exclusively associate with digital device 200 that identifies it as globally unique in conjunction with the aforementioned user information and device information.

In step 325, digital device 200 generates a hash of the public key and sends H(PnPUB) 330 to transaction server system 115. As shown in FIG. 2, digital device 200 is illustrated displaying a hash of a public key together with instructions to input the hash 210 into a website (which may be associated with transaction server system 115). A user may copy the displayed hash into one or more appropriate input fields of a website associated with transaction server system 115.

In some aspects, digital device 200 may send H(PnPUB) 330 to transaction server system 115 before, after, or at the same time as public key 310 is sent to authorization server system 120. Digital device 200 may alternatively coordinate sending of H(PnPUB) 330 to transaction server system 115 and sending PnPUB 310 to authorization server system 120 using one or more predetermined timing and communication protocols and/or challenge and response mechanisms.

Once H(PnPUB) 330 is received from digital device 200, transaction server system 115 sends H(PnPUB) and user ID 335 to authorization server system 120. Authorization server system 120 sends back PnPUB and device ID 340 to transaction server system 115. Transaction server system 115 computes a hash of the public key H(PNPUB) in step 345 and ensures that the computed hash corresponds to the hash received from digital device 200 in step 350. Once the two hashes match, transaction server system 115 registers a verification event that transaction server system 115 has the public key of a private key stored in digital device 200. Accordingly, transaction server system 115 can verify messages signed by digital device 200.

In step 355, authorization server system 120 finalizes registration by linking digital device 200 to an account associated with the appropriate user or organization. Optionally, authorization server system 120 may send an enrollment success status to digital client 200.

Figure 4:
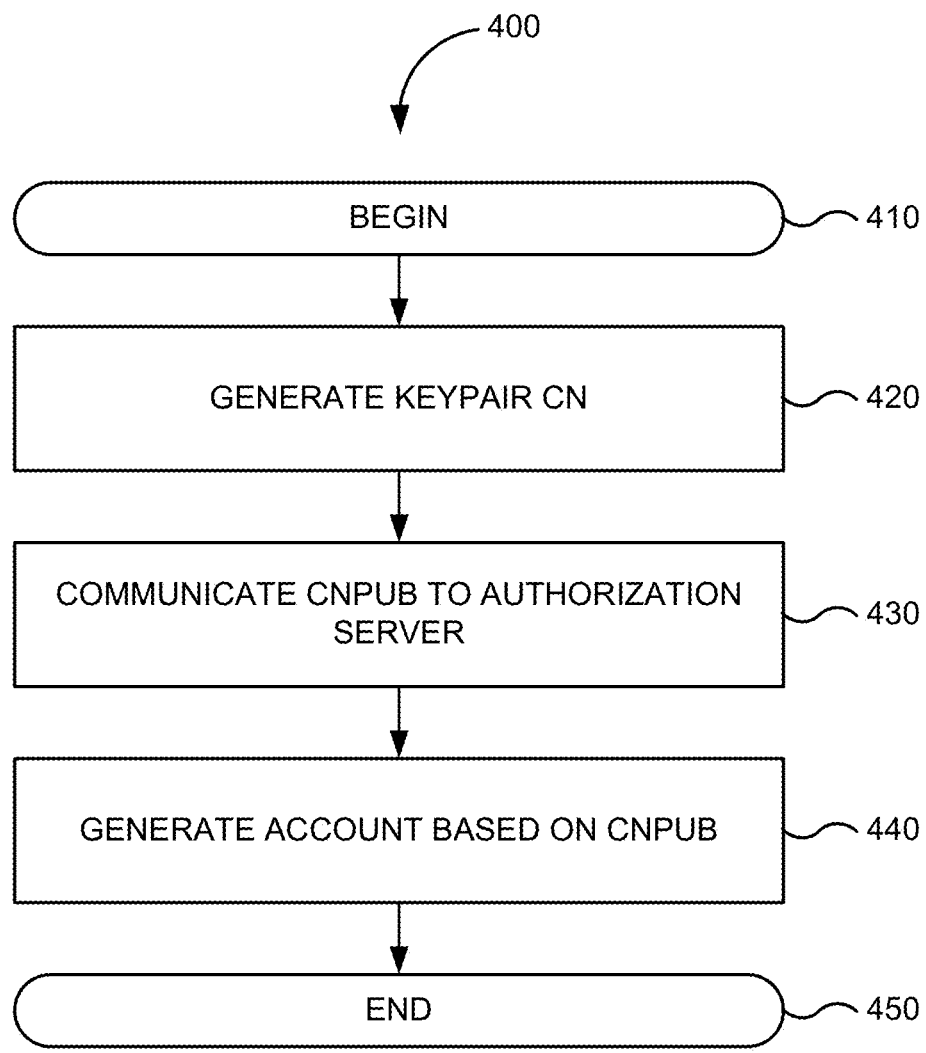
FIG. 4 is a flowchart of a method for registering a transaction server system with an authorization server system for authorizing transactions in one embodiment.

In further embodiments, in order to provide real-time secure authorization, transaction server system 115 registers with or otherwise enrolls with authorization server system 120. FIG. 4 is a flowchart of method 400 for registering transaction server system 115 with authorization server system 120 for authorizing transactions in one embodiment. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, transaction server system 115 generates a public and private cryptographic key pair Cn. Preferably, n is unique to each of one or more computer systems and devices that intend on communicating with authorization server system 120 and Cn is generated using a 2048 bit RSA algorithm or other cryptographically stronger process.

In step 430, transaction server system 115 communicates (e.g., uploads) CnPUB to authorization server system 120. In step 440, authorization server system 120 makes an account for transaction server system 115 based on CnPUB. In some aspects, authorization server system 120 saves the received CnPUB to verify signatures made by transaction server system 115. Transaction server system 115 may verify authorization server system 120 in future communications using either IP verification and/or SSL client authentication, for example.

Secure Real-Time Authorizations of Transactions

Figure 5:
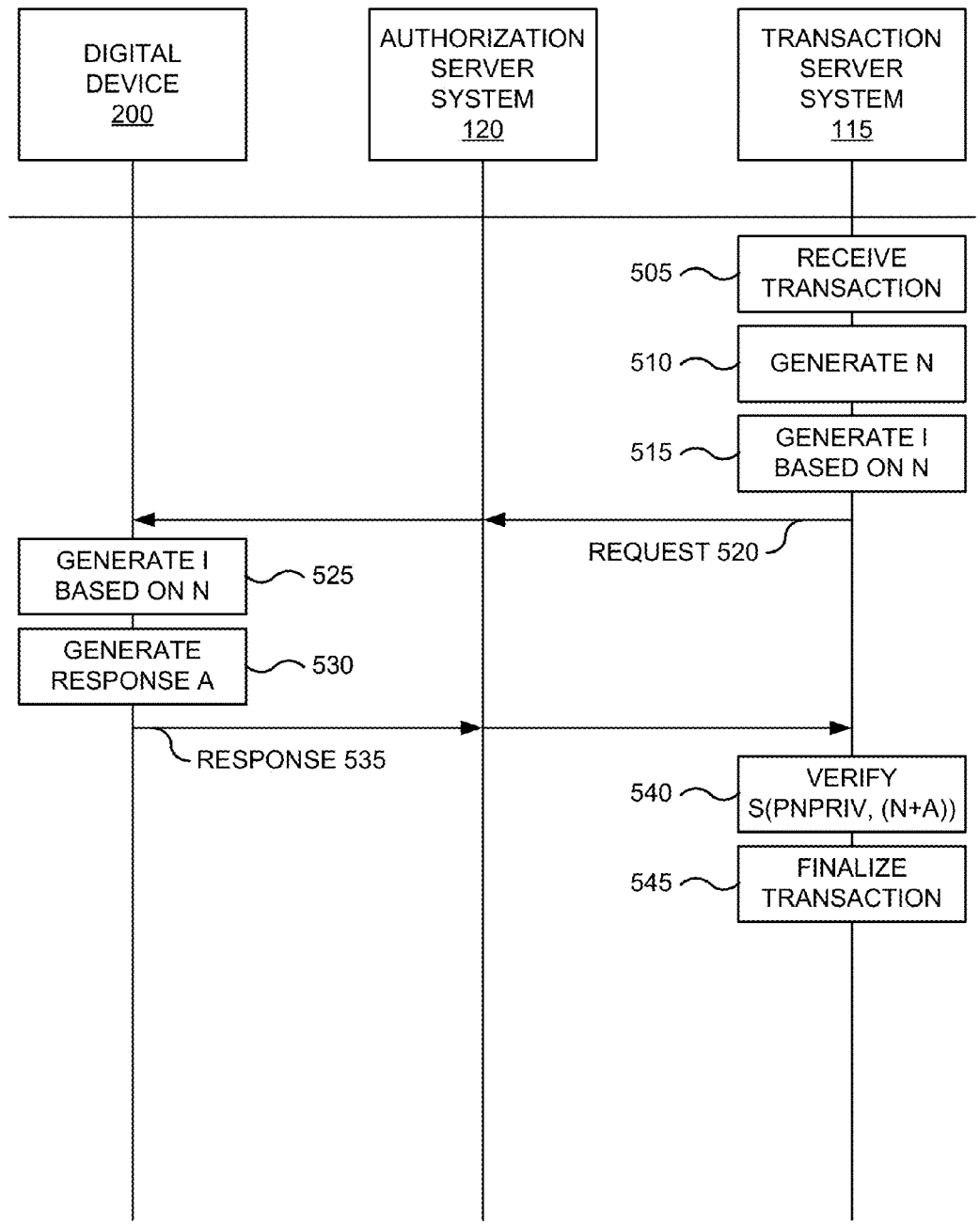
FIG. 5 is a message sequence chart depicting authorization of transaction using the digital device of FIG. 2 in one embodiment.

FIG. 5 is a message sequence chart depicting authorization of transaction using device 200 in one embodiment. In this embodiment, secondary client system 125 embodied as digital device 200 is used to authorize transactions. While some processing blocks and the communication of certain messages are illustrated as occurring before or after others in FIG. 5, it should be understood that unless otherwise specified as having such a dependency processing blocks and the communication of messages can occur either in parallel, in series, or in a combination thereof.

In this example, in step 505, transaction server system 115 receives a transaction. For example, transaction server system 115 may receive transaction data from one or more sources. One example of a transaction may be a login request where a user may type their username and password into a website, mobile app, or other software to initiate a login transaction. Another example of a transaction includes credit card/debit card/merchant card transactions initiated from brick and mortar storefronts, over the telephone, or the like. Further examples of a transaction include digital transactions for purchasing digital goods, sending payments, tracking packages and deliveries, accessing electronic resources and libraries, or the like.

In step 510, transaction server system 115 generates a nonce N. In one embodiment, N is a random 256-bit nonce. One or more of a variety of algorithms may be used to generate an arbitrary number or string to be used only once in a cryptographic communication.

Figure 6:
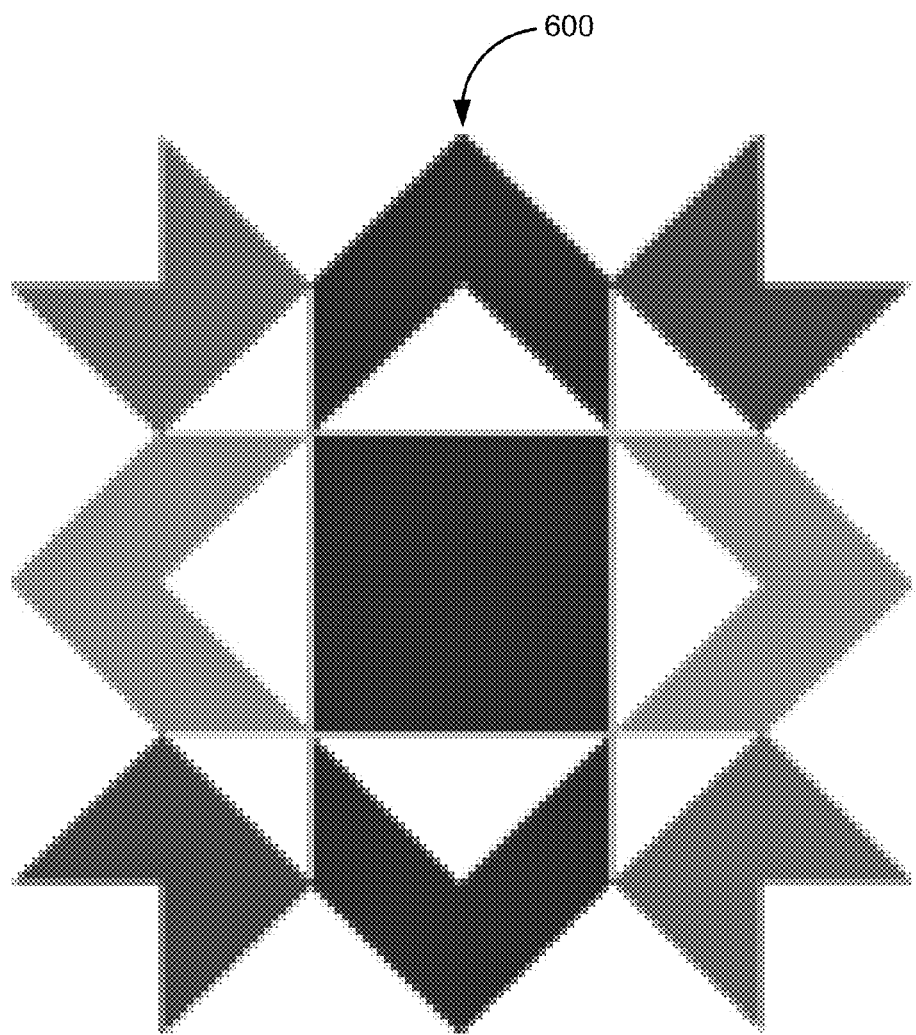
FIGS. 6, 7, and 8 are illustrations of visual representations of nonces that may be used by the system of FIG. 1 for authorizing transactions in several embodiments.
Figure 7:
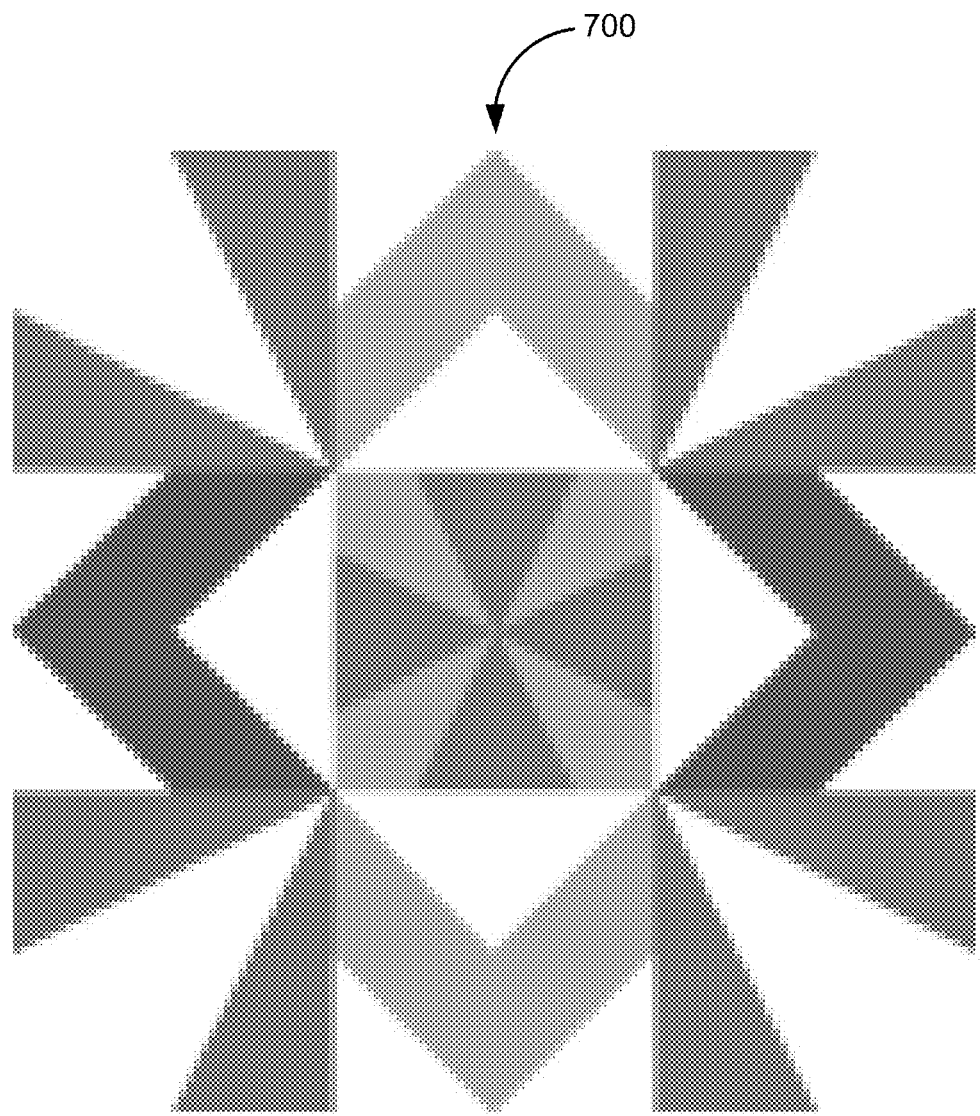
Figure 8:
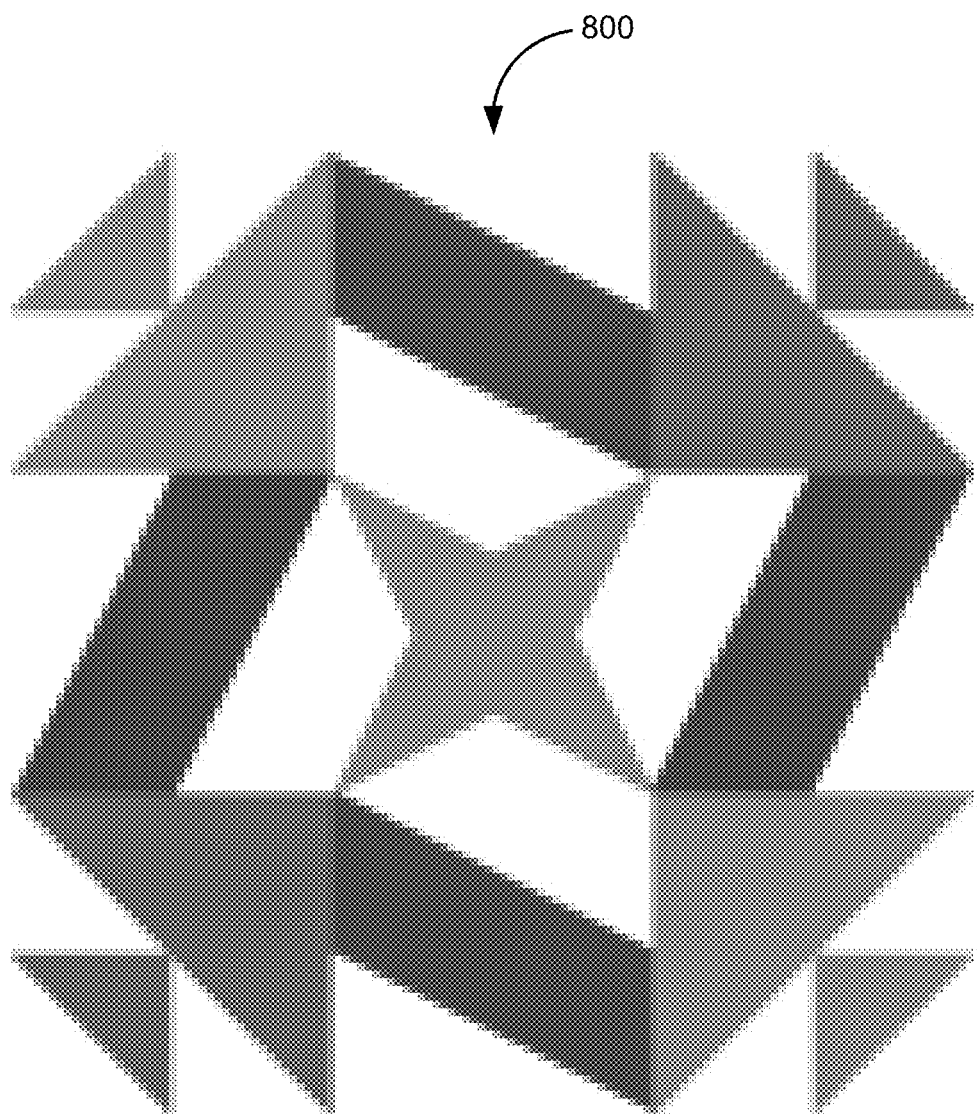

In step 515, transaction server system 115 generates an Identicon (I) based on N. In this disclosure, an Identicon means a visual representation of a data generated using a hash visualization algorithm. An Identicon may include one or more images or other visual elements that represent all or part of a hash. Some examples of an Identicon are shown in FIGS. 6, 7, and 8. In this example, transaction server system 115 causes I to be displayed to a user for use in a comparison as discussed further below. In some embodiments, transaction server system 115 does not or is not required to generate I, but may communicate only N to one or more devices. In some aspects, the one or more devices may generate and/or display I. In further aspects, In some embodiments, no devices are required to generate and/or display I.

In FIG. 5, transaction server system 115 sends request 520 to authorization server system 120. Request 520 typically includes at least N. Request 520 may include information about the transaction, information about parties to the transaction, or the like. In one example, request 520 may include information identifying a registered user of authorization server system 120. In another example, request 520 may include information identifying one or more actions that need to be authorized. In one embodiment, request 520 includes information asking for an authentication to log into an account associated with a user ID.

In some aspects, transaction server system 115 may poll authorization server system 120 for the status of the authentication for a predetermined amount of time or until the occurrence of one or more events. In others aspects, push-pull mechanisms may be used to allow transaction server system 115 to send and receive information from authorization server system 120.

In FIG. 5, authorization server system 120 relays request 520 (including N) to devices (including device 200) registered with an account of a registered user determined from request 520. Accordingly, a user of each registered devices is able to authorize the transaction as described further below.

In step 525, in this example, digital device 200 generates an Identicon (I) based on N. For example, digital device 200 may display a screen that includes I and two buttons "Accept" and "Reject." Digital device 200 may also display other information. As discussed above, in some embodiments, digital device 200 may display transaction information without I and two buttons "Accept" and "Reject." Digital device 200 may also display a number of failed requests since last successful request and a time stamp of when the request was generated.

In this example, if I has been displayed on digital device 200 for further confirmation, the user may be instructed to confirm that I displayed on digital device 200 matches the display of I generated by transaction server system 115 before accepting or rejecting request 520.

In step 530, digital device 200 generates a response to request 520. For example, the user may decide to either accept or reject the login request. To do so, the user may press the appropriate button resulting in an authentication response A (e.g., 1 or 0). Digital device 200 then sends response 535 (including N, A, and S(PnPRIV, (N+A))) to authorization server system 120. S(PnPRIV, (N+A))) represents a signing of (N+A) using the private key portion of Pn (PnPRIV).

In FIG. 5, authorization server system 120 relays response 535 (including N, A, and S(PnPRIV, (N+A))) transaction server system 115. Authorization server system 120 may add response 535 to an undelivered responses table and deliver response 535 when transaction server system 115 next asks for the result of any outstanding authentication requests.

In step 540, transaction server system 115 verifies S(Pn-PRIV, (N+A))). For example, transaction server system 115 may verify the signature against a list of stored public keys (PnPUB). Transaction server system 115 may utilize a variety of optimizations to determine the correct PNPUB.

In step 545, transaction server system 115 finalizes the transaction. For example, if the signature is verified transaction server system 115 completes the transaction. If the signature is not verified, transaction server system 115 may roll back the transaction, disallow the transaction, or otherwise invoke one or more procedures or workflows for further processing. In the example of a login transaction, transaction server system 115 allows the user to log in assuming the response was "Accept" and presents a failure dialog if the response was "Reject."

In further aspects, while some embodiments disclosed show a single operation accept or decline process by clicking a button, it should be recognized that other approval processes may be used. For example, a mobile device may show an accept button, a decline button, and/or a request more information button. The request more information button may request more information from the transaction originator through a text message, phone call, data transfer, or other method of communication.

As described above, transaction authorities can obtain transaction authorizations without entrusting all security to a central server. System 100 enables transaction authorities to detect attempts to tamper with information sent by secondary client system 125 by checking a cryptographic signature of responses. Therefore, using the continuous connectivity of various systems, including mobile devices and datacenters, real-time secure authorization for transactions may be performed with less effort.

Visual Confirmation

As discussed above, the approval process in some embodiments requires comparing nonces at step 550 illustrated in FIG. 1.

In some embodiments, primary client system 110 receives a random nonce from transaction server system 115 at the time of transaction 135. Primary client system 110 may display a visual representation of the random nonce. In one embodiment, the random nonce is sent as part of transaction information communicated to secondary client system 125. Secondary client system 125 may display a visual representation of the random nonce along with an authorization request.

Authorizer 130 may be asked to authorize the transaction through secondary client system 125 only if a visual representation of the random nonce displayed on primary client system 110 and a visual representation of the random nonce displayed on secondary client system 125 are identical or otherwise satisfy a predetermined set of recognition criteria.

In some embodiments, secondary client system 125 receives transaction details from transaction server system 115 at the time of transaction 135. Secondary client system 125 may display a visual representation of the transaction details in addition to or in lieu of the random nonce. Primary client system 110 may not display any visual representation of the random nonce in some embodiments. In one embodiment, the transaction details are sent as part of transaction information communicated to secondary client system 125. Secondary client system 125 may display a visual representation of the transaction details along with an authorization request.

Authorizer 130 may be asked to authorize the transaction through secondary client system 125 only if, at step 550, a visual representation of the random nonce displayed on primary client system 110 and a visual representation of the random nonce displayed on secondary client system 125 are identical or otherwise satisfy a predetermined set of recognition criteria.

Examples of visual representations of a nonce in several embodiments are shown in FIGS. 6, 7, and 8. In one aspect, the use of a visual representation of a nonce can provide substantiation and assurances to operators of transaction server system 115 that user's authorizations correspond to initial authorization requests. Advantageously, using the nonce can help in preventing advanced phishing attacks against users because each user confirms that an authorization request is related to a transaction by comparing the displayed nonces.

In some embodiments, a visual representation of a nonce can be generated by mapping a unique instance of shape, inversion, position, rotation, and color out of a set of unique shapes, inversions, positions, rotations, and colors to the corresponding nonce. Other visual representations may be used as well, such as taking any set of individually distinguishable visual elements and mapping them in a one-to-one correspondence with the nonce Additional Confirmation In further embodiments, the approval process may require one or more other predetermined actions, such as a password/PIN entry, before accepting or declining the transaction. For example, referring again to FIG. 5, generating response A in step 530 may also be protected by having the user enter a PIN. In addition to clicking a button, the user may respond to request 520 by entering a pre-set PIN that the user had previously chosen when secondary client system 125 embodied as digital device 200 in FIG. 5 was enrolled with authorization server system 120. Digital device 200 may be configured to allow the user to accept the transaction or reject it only once the user enters the correct PIN. Having a PIN may allow the user to add an extra layer of security whereby even physically losing a registered device would not compromise the ability to authorize transactions.

Example Transaction Authorizations

In various embodiments, system 100 may be used to authorize a user login transaction. For example, a user may attempt to log in to a bank website. In another example, an employee may attempt to initiate a VPN connection to a corporate network. In one embodiment, an originator of a transaction for secure online account access may supply secure user credentials to log in to an account.

Figure 9:
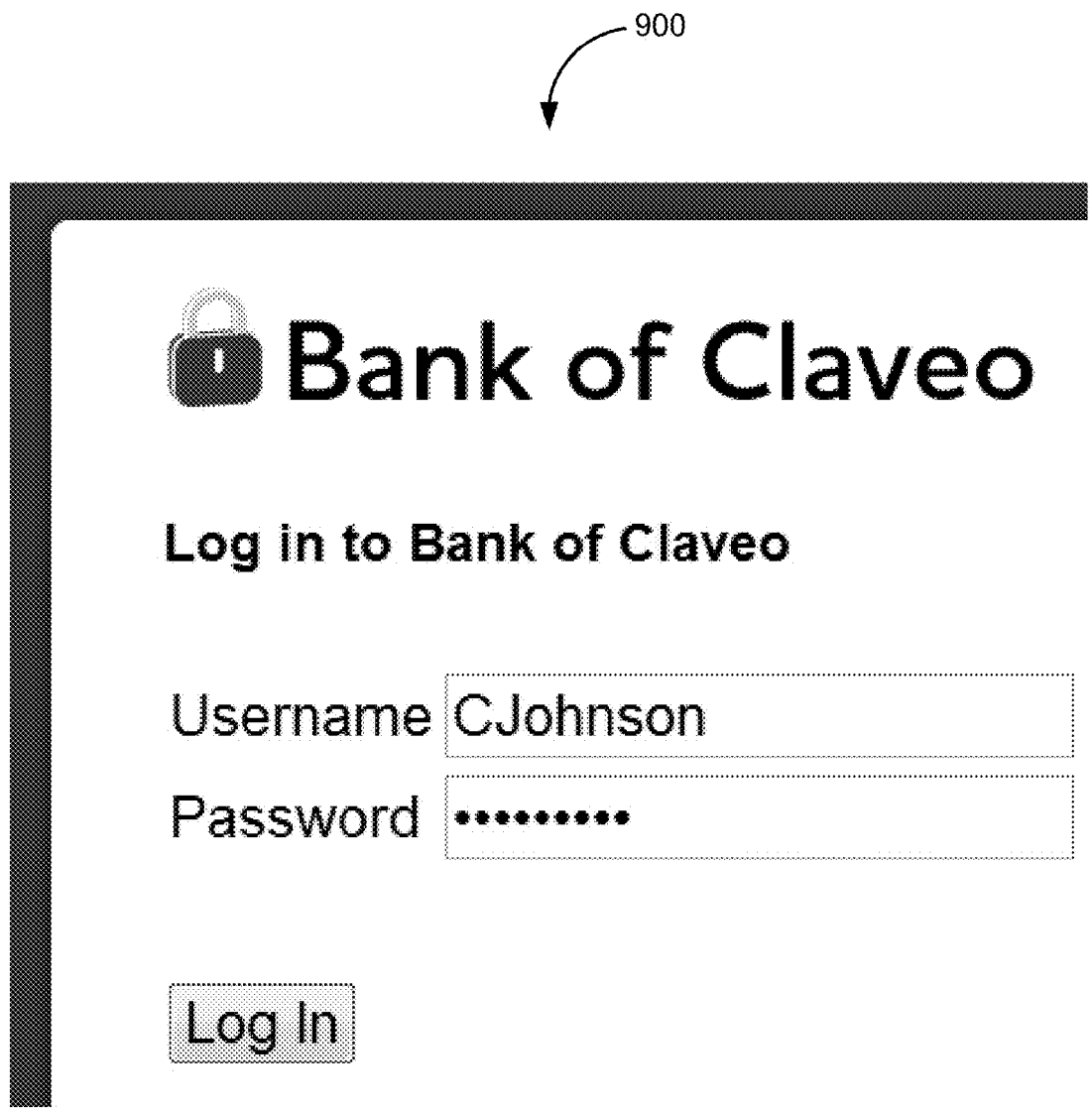
FIG. 9 is a screenshot of a user interface showing an example where a user is attempting to log in to a bank's website in one embodiment.

FIG. 9 is a screenshot of a user interface showing an example where a user is attempting to log in to a bank's website in one embodiment. In this example, transaction server system 115 is embodied as one or more web servers and/or applications servers associated with the bank. Authorization server system 120 is embodied as one or more servers associated with an authentication provider company that previously enrolled one or more users as customers of the bank. Each user has registered at least one mobile device representing secondary client system 125.

Figure 10:
FIG. 10 is an illustration of a digital device displaying a request to authorize the login attempt shown in FIG. 9 in one embodiment.

Once a user tries to log in to the online account using the user's credentials, transaction server system 115 issues an authorization request to the authentication provider (e.g., authorization server system 120). The authentication provider sends a request to the mobile device of the user to authorize access to the online account. FIG. 10 is an illustration of digital device 1000 displaying a request to authorize the login attempt shown in FIG. 9 in one embodiment.

For example, digital device 1000 may display a message with information about the online account being accessed. In FIG. 10, the user is shown two buttons: one for authorizing the online account access and one to reject the online account access. In the embodiment shown, a single click of button the mobile device may send the originator's response to the authentication provider. The authentication provider may send the originator's response to the website's server. The website's server then may verify the response and allow the originator access if approved.

In further embodiments, system 100 may be used to authorize financial transactions. For example, primary client system 110 may be embodied as a credit or debit card terminal at a retail store or an online payment processing system (with "credit or debit card" hereafter referred to as "credit card"). The transaction may be a purchase carried out using a credit card. The originator of the transaction may be the owner of the credit card or another authorized user.

Transaction server system 115 may be embodied as a payment-processing server. Authorization server system 120 may be an authentication provider company that has previously enrolled the card owner and has registered a mobile device of the card owner as secondary client system 125. The authentication provider may also store the card owner's information and/or the card owner's mobile device information.

Figure 11:
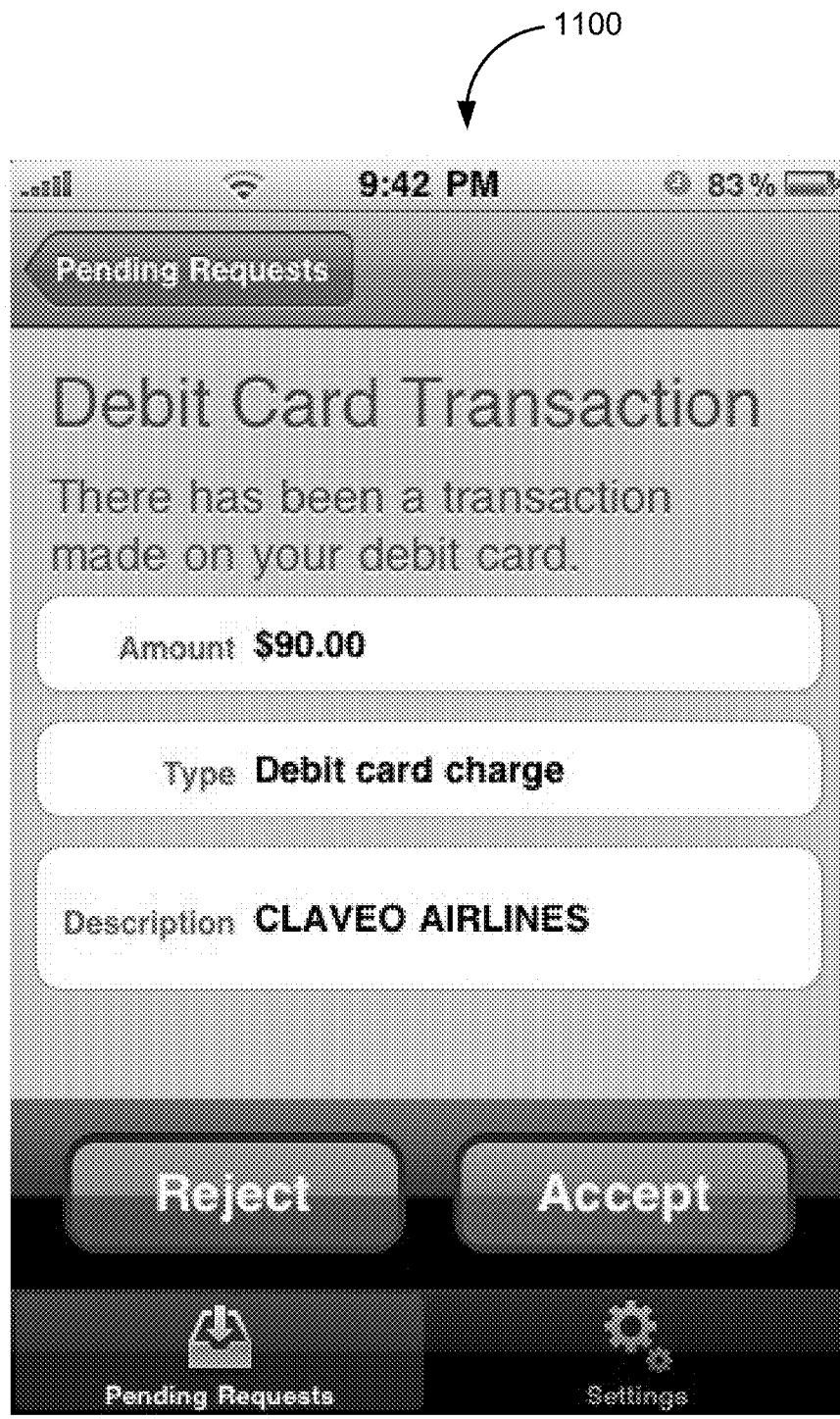
FIG. 11 is an illustration of a user interface displayed on a mobile device to authorize a financial transaction in one embodiment.

In this example, the authentication provider sends a request to the mobile device to authenticate the credit card purchase. The card owner's mobile device may display a message with information about the purchase. FIG. 11 is an illustration of user interface 1100 displayed on a mobile device to authorize a financial transaction in one embodiment. In this example, the originator may be shown two buttons; one for authorizing the purchase and one to reject the purchase.

As discussed above, the originator may respond through use of the mobile device, such as with a single click of a button the mobile device. The mobile device sends the originator's response to the authentication provider. The authentication provider may send the originator's response to the payment-processing server. The payment-processing server may verify the response and, if approved, authorize the purchase based at least in part on the originator's response.

Figure 12:
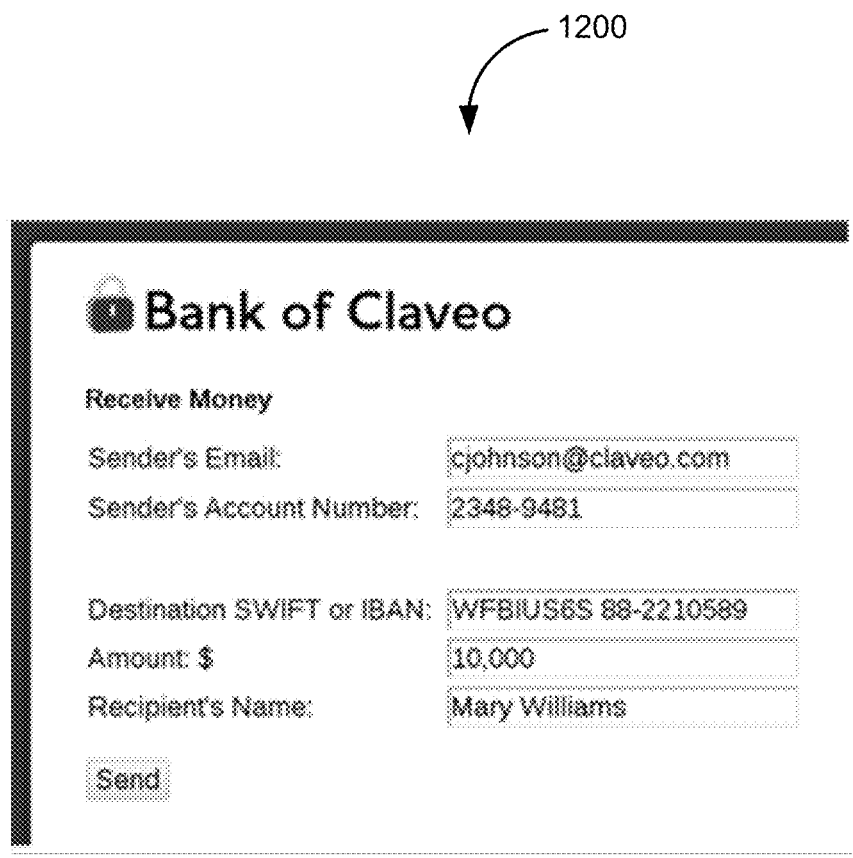
FIG. 12 is a screenshot of a user interface showing an example where a user is processing a digital transaction using a bank's website in one embodiment.

In still further embodiments, system 100 may be used to authorize one or more digital transactions. For example, primary client system 110 may be embodied as a personal computer or Internet-connected device that can perform secure digital transactions. The transaction may be a secure digital transaction that requests verification and/or authorization from at least one associated party to proceed (including, for example, a bank wire transfer, an online payment, or any transaction that uses authorization by one party to perform the transaction on behalf of the same or a different party). The originator of the transaction may be a requester of the transaction (requester of payment, for example). FIG. 12 is a screenshot of user interface 1200 showing an example where a user is processing a digital transaction using a bank's website in one embodiment.

The authorizer may be a party that has the authority to authorize the transaction, which may or may not be the originator. Transaction server system 115 may be embodied as a transaction-processing server. Authorization server system 120 may be embodied as an authentication provider company that has previously enrolled the authorizer and has registered a mobile device of the authorizer as secondary client system 125. The authentication provider may also store the authorizer's information and/or the authorizer's mobile device information.

Figure 13:
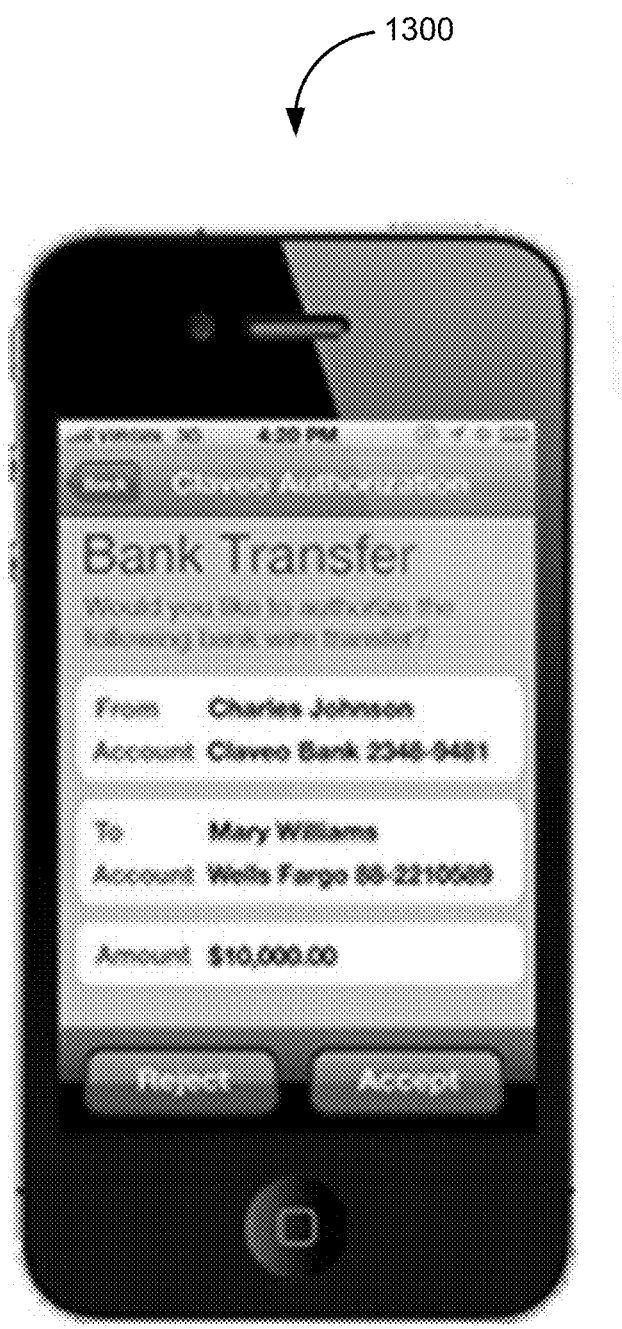
FIG. 13 is an illustration of a digital device displaying a request to authorize the digital transaction shown in FIG. 12 in one embodiment.

In this example, the authentication provider may send a request to the mobile device to authorize the transaction. The authorizer's mobile device may display a message with information about the transaction. FIG. 13 is an illustration of digital device 1300 displaying a request to authorize the digital transaction shown in FIG. 12 in one embodiment. The authorizer may be shown two buttons on the mobile device: one for authorizing the transaction and one to reject the transaction. With a click of an accept button, the mobile device sends the authorizer's response to the authentication provider. The authentication provider may send the authorizer's response to the transaction-processing server. The transaction-processing server may verify the response and/ or authorizes the transaction on behalf of the originator according to the authorizer's response, if approved.

Conclusion

Figure 14:
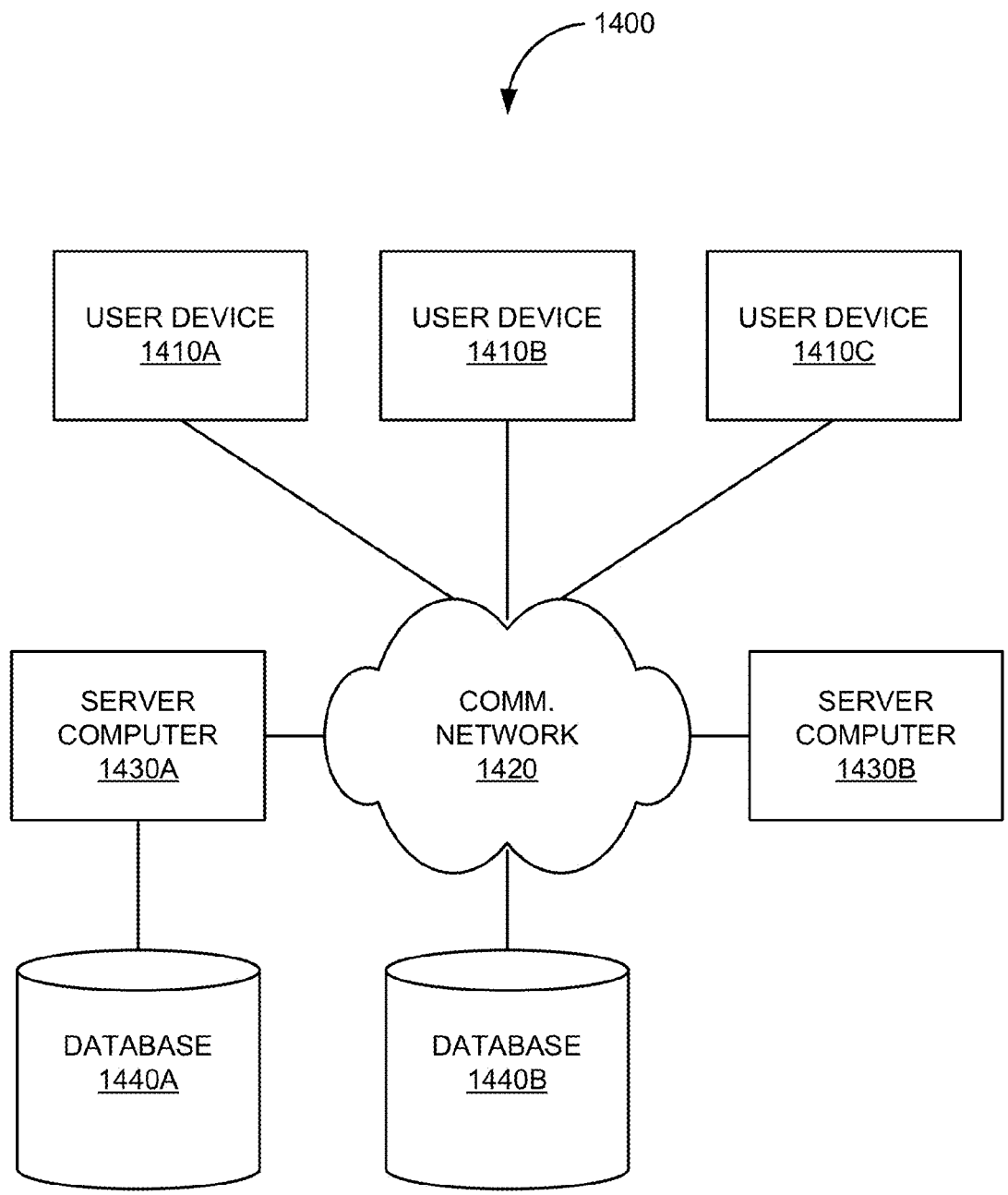
FIG. 14 is a simplified illustration of a system that may incorporate an embodiment of the present invention.

FIG. 14 is a simplified illustration of system 1400 that may incorporate an embodiment or be incorporated into an embodiment of any of the innovations, embodiments, and/or examples found within this disclosure. FIG. 14 is merely illustrative of an embodiment incorporating the present invention and does not limit the scope of the invention as recited in the claims. One of ordinary skill in the art would recognize other variations, modifications, and alternatives.

In one embodiment, system 1400 includes one or more user devices 1410 (e.g., devices 1410A, 1410B, and 1410C). User devices 1410 can be general-purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user devices 1410 can also have any of a variety of applications, including one or more applications configured to perform methods of the invention, as well as one or more office applications, database client and/or server applications, and web browser applications.

Alternatively, user devices 1410 can be any other electronic device, such as a thin-client computer, Internet-enabled mobile telephone, and/or personal digital assistant, capable of communicating via a network (e.g., communications network 1420 described below) and/or displaying and navigating web pages or other types of electronic documents. Although the exemplary system 1400 is shown with three user computers, any number of user computers or devices can be supported.

Certain embodiments of the invention operate in a networked environment, which can include communications network 1420. Communications network 1420 can be any type of network familiar to those skilled in the art that can support data communications using any of a variety of commercially available protocols, including without limitation TCP/IP, SNA, IPX, AppleTalk, and the like. Merely by way of example, communications network 1420 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 1430 (e.g., computers 1430A and 1430B). Each of server computers 1430 may be configured with an operating system including without limitation any of those discussed above, as well as any commercially available server operating systems. Each of server computers 1430 may also be running one or more applications, which can be configured to provide services to one or more clients (e.g., user devices 1410) and/or other servers (e.g., server computers 1430).

Merely by way of example, one of server computers 1430 may be a web server, which can be used, merely by way of example, to process requests for web pages or other electronic documents from user devices 1410. The web server can also run a variety of server applications, including HTTP servers, FTP servers, CGI servers, database servers, Java servers, and the like. In some embodiments of the invention, the web server may be configured to serve web pages that can be operated within a web browser on one or more of the user devices 1410 to perform methods of the invention.

Server computers 1430, in some embodiments, might include one or more file and or/application servers, which can include one or more applications accessible by a client running on one or more of user devices 1410 and/or other server computers 1430. Merely by way of example, one or more of server computers 1430 can be one or more general purpose computers capable of executing programs or scripts in response to user devices 1410 and/or other server computers 1430, including without limitation web applications (which might, in some cases, be configured to perform methods of the invention).

Merely by way of example, a web application can be implemented as one or more scripts or programs written in any programming language, such as Java, C, or C++, and/or any scripting language, such as Perl, Python, or TCL, as well as combinations of any programming/scripting languages. The application server(s) can also include database servers, including without limitation those commercially available from Oracle, Microsoft, IBM and the like, which can process requests from database clients running on one of user devices 1410 and/or another of server computers 1430.

In accordance with further embodiments, one or more of server computers 1430 can function as a file server and/or can include one or more of the files necessary to implement methods of the invention incorporated by an application running on one of user devices 1410 and/or another of server computers 1430. Alternatively, as those skilled in the art will appreciate, a file server can include all necessary files, allowing such an application to be invoked remotely by one or more of user devices 1410 and/or server computers 1430. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 1400 can include one or more databases 1440 (e.g., databases 1440A and 1440B). The location of the database(s) 1440 is discretionary: merely by way of example, database 1440A might reside on a storage medium local to (and/or resident in) server computer 1430A (and/or one or more of user devices 1410). Alternatively, database 1440B can be remote from any or all of user devices 1410 and server computers 1430, so long as it can be in communication (e.g., via communications network 1420) with one or more of these. In a particular set of embodiments, databases 1440 can reside in a storage-area network ("SAN") familiar to those skilled in the art. (Likewise, any necessary files for performing the functions attributed to user devices 1410 and server computers 1430 can be stored locally on the respective computer and/or remotely, as appropriate). In one set of embodiments, one or more of databases 1440 can be a relational database that is adapted to store, update, and retrieve data in response to SQL-formatted commands. Databases 1440 might be controlled and/or maintained by a database server, as described above, for example.

Figure 15:
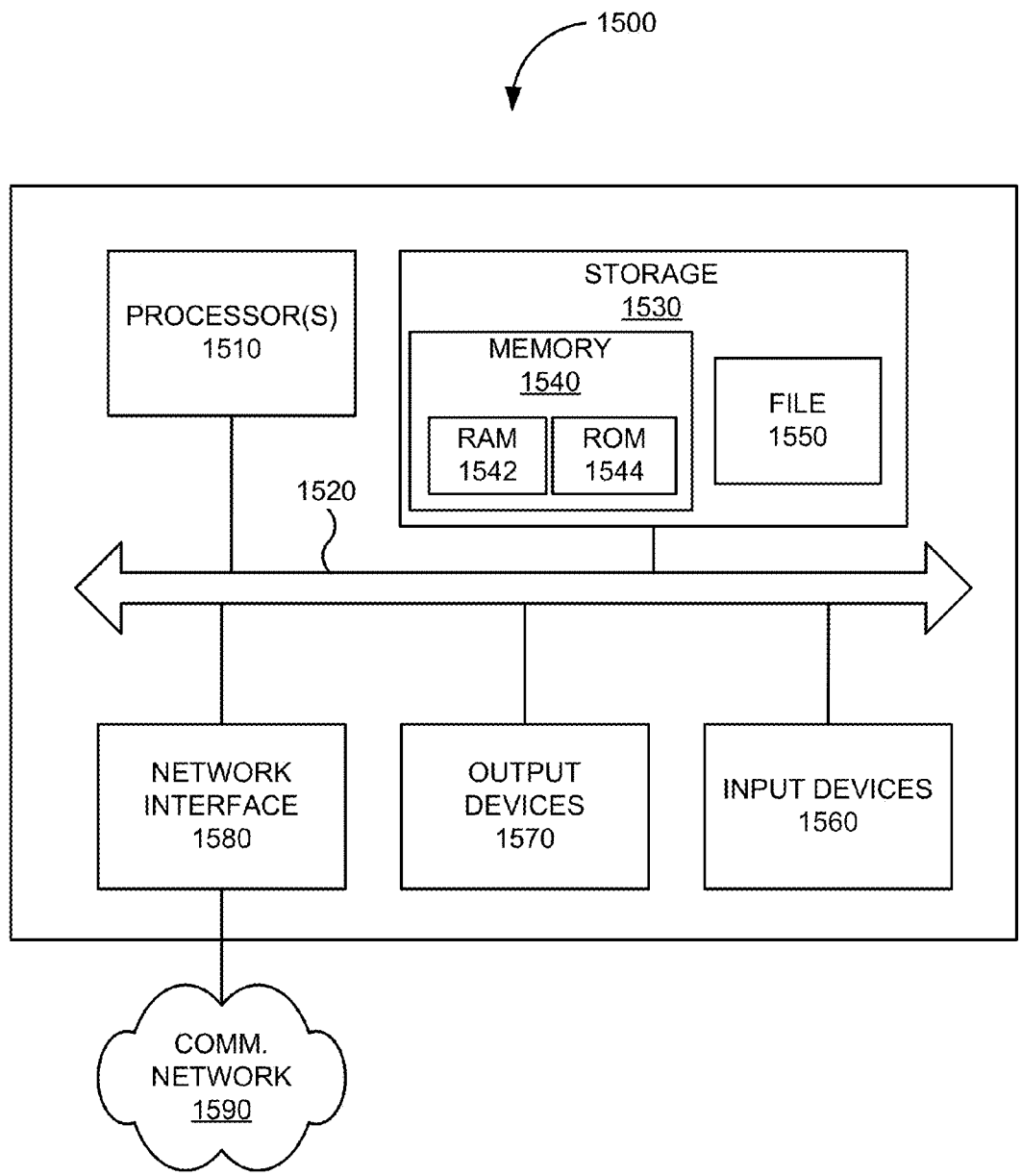
FIG. 15 is a simplified block diagram of a device that may be used to practice embodiments of the present invention.

FIG. 15 is a simplified block diagram of device 1500 that may be used to practice embodiments of the present invention. As shown in FIG. 15, device 1500 includes processor 1510 that communicates with a number of peripheral devices via bus subsystem 1520. These peripheral devices may include storage subsystem 1530, comprising memory subsystem 1540 and file storage subsystem 1550, input devices 1560, output devices 1570, and network interface subsystem 1580.

Bus subsystem 1520 provides a mechanism for letting the various components and subsystems of device 1500 communicate with each other as intended. Although bus subsystem 1520 is shown schematically as a single bus, alternative embodiments of the bus subsystem may utilize multiple busses.

Storage subsystem 1530 may be configured to store the basic programming and data constructs that provide the functionality of the present invention. Software (code modules or instructions) that provides the functionality of the present invention may be stored in storage subsystem 1530. These software modules or instructions may be executed by processor(s) 1510. Storage subsystem 1530 may also provide a repository for storing data used in accordance with the present invention. Storage subsystem 1530 may comprise memory subsystem 1540 and file/disk storage subsystem 1550.

Memory subsystem 1540 may include a number of memories including a main random access memory (RAM) 1542 for storage of instructions and data during program execution and a read only memory (ROM) 1544 in which fixed instructions are stored. File storage subsystem 1550 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Input devices 1560 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to device 1500.

Output devices 1570 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from device 1500.

Network interface subsystem 1580 provides an interface to other computer systems, devices, and networks, such as communications network 1590. Network interface subsystem 1580 serves as an interface for receiving data from and transmitting data to other systems from device 1500. Some examples of communications network 1590 are private networks, public networks, leased lines, the Internet, Ethernet networks, token ring networks, fiber optic networks, and the like.

Device 1500 can be of various types including a personal computer, a portable computer, a workstation, a network computer, a mainframe, a kiosk, or any other data processing system. Due to the ever-changing nature of computers and networks, the description of device 1500 depicted in FIG. 15 is intended only as a specific example for purposes of illustrating the preferred embodiment of the computer system. Many other configurations having more or fewer components than the system depicted in FIG. 15 are possible.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for providing transaction authorization, the method comprising:

receiving, at one or more computer systems, a request from one or more transaction systems to approve a transaction being processed by the one or more transaction systems, the request to approve the transaction including at least a nonce generated by the one or more transaction systems, the transaction being initiated with a primary client system;

determining, with one or more processors associated with the one or more computer systems, device information for at least one party to the transaction, the device information designating a secondary client system at which the at least one party receives authorization requests, wherein a registration of the secondary client system with the one or more computer systems includes:

communicating, using the one or more computer systems, a public key to the one or more transaction systems such that the one or more transaction systems verify cryptographic validity of the public key using a hash, the public key and a corresponding private key being generated on the secondary client system, and registering, by the one or more computer systems, the secondary client system based on the one or more transaction systems verifying the cryptographic validity of the public key;

communicating, using the one or more computer systems, an authorization request to the secondary client system based on the request to approve the transaction, wherein the authorization request includes the nonce;

receiving, using the one or more computer systems, a response to the authorization request from the secondary client system based on the request to approve the transaction, wherein the response is received in response to a comparison of a first visual representation of the nonce displayed at the primary client system with a second visual representation of the nonce displayed at the secondary client system, wherein the first visual representation of the nonce is generated by the one or more transaction systems and transmitted to the primary client system along with the nonce by the one or more transaction systems, wherein the second visual representation of the nonce is generated by the secondary client system; and communicating, using the one or more computer systems, the response to the authorization request to the one or more transaction systems for verification that the response to the authorization request includes the nonce and authorization information both cryptographically signed by the private key corresponding to the public key previously communicated to the one or more transaction systems, wherein the private key is associated with the secondary client system.

2. The method of claim 1 wherein the transaction comprises a login transaction wherein a user supplies a username and password to the one or more transaction systems.

3. The method of claim 1 wherein the transaction comprises a financial transaction wherein a credit card or debit card of a user is swiped in a processing terminal of a merchant.

4. The method of claim 1 wherein the transaction comprises a financial transaction wherein near-field communication (NFC) is used to allow a processing terminal of a merchant to access bank information of a user.

5. The method of claim 1 wherein the transaction comprises an online financial transaction.

6. The method of claim 1 wherein the public key is verified on the one or more transaction systems in response to a comparison between a first hash of the public key, the first hash generated on the secondary client system, and a second hash of the public key, the second hash generated on the one or more transaction systems.

7. The method of claim 1 further comprising receiving the response to the authorization request; and
performing the verification that the response to the authorization request includes the nonce and authorization information both cryptographically signed by a private key associated with the secondary client system.

8. The method of claim 1 further comprising receiving the response to the authorization request in response to the secondary client system receiving a personal identification number (PIN) enabling the secondary client system to generate authorization information.

9. The method of claim 1 wherein determining device information for the at least one party to the transaction, the device information designating the secondary client system comprising retrieving user information stored based on receiving the public key.

10. The method of claim 1, wherein the primary client system is a first digital device and the secondary client system is a second digital device separate from the first digital device.

11. The method of claim 1, wherein the device information designates a plurality of client systems at which the at least one party receives authorization requests, the plurality of client systems include the secondary client system.

12. The method of claim 11, further comprising:
retrieving, by the one or more computer systems, previously stored information associated with the secondary client system; and
identifying, by the one or more computer systems, the secondary client system.

13. The method of claim 11, further comprising:
communicating, using the one or more computer systems, the authorization request to the plurality of client systems.

14. A non-transitory computer-readable medium storing computer-executable code for providing transaction authorization, the non-transitory computer-readable medium comprising:
code for receiving a request from one or more transaction systems to approve a transaction being processed by the one or more transaction systems, the request to approve the transaction including at least a nonce generated by the one or more transaction systems, the transaction being initiated with a primary client system;
code for determining device information for at least one party to the transaction, the device information designating a secondary client system at which the at least one party receives authorization requests determining, with one or more processors associated with the one or more computer systems, device information for at least one party to the transaction, the device information designating a secondary client system at which the at least one party receives authorization requests, wherein a registration of the secondary client system with the one or more computer systems includes:
communicating a public key to the one or more transaction systems such that the one or more transaction systems verify cryptographic validity of the public key using a hash, the public key and a corresponding private key being generated on the secondary client system, and
registering the secondary client system based on the one or more transaction systems verifying the cryptographic validity of the public key;
code for communicating an authorization request to the secondary client system based on the request to approve the transaction, wherein the authorization request includes the nonce;
code for receiving a response to the authorization request from the secondary client system based on the request to approve the transaction, wherein the response is received in response to a comparison of a first visual representation of the nonce displayed at the primary client system with a second visual representation of the nonce displayed at the secondary client system, wherein the first visual representation of the nonce is generated by the one or more transaction systems and transmitted to the primary client system along with the nonce by the one or more transaction systems, wherein the second visual representation of the nonce is generated by the secondary client system; and
code for communicating the response to the authorization request to the one or more transaction systems for verification that the response to the authorization request includes the nonce and authorization information both cryptographically signed by the private key corresponding to the public key previously communicated to the one or more transaction systems, wherein the private key is associated with the secondary client system.

15. The non-transitory computer-readable medium of claim 14 wherein the public key is verified on the one or more transaction systems in response to a comparison between a first hash of the public key, the first hash generated on the secondary client system, and a second hash of the public key, the second hash generated on the one or more transaction systems.

16. The non-transitory computer-readable medium of claim 14 further comprising code for receiving the response to the authorization request; and
code for performing the verification that the response to the authorization request includes the nonce and authorization information both cryptographically signed by a private key associated with the secondary client system.

17. The non-transitory computer-readable medium of claim 14 further comprising code for receiving the response to the authorization request in response to the secondary client system receiving a personal identification number (PIN) enabling the secondary client system to generate authorization information.

18. A system for providing transaction authorization, the system comprising:
a processor; and
a memory storing a set of instructions which configure the processor to:
receive a request from one or more transaction systems to approve a transaction being processed by the one or more transaction systems, the request to approve the transaction including at least a nonce generated by the one or more transaction systems, the transaction being initiated with a primary client system;
retrieve information from a database for at least one party to the transaction, the information designating a secondary client system at which the at least one party receives authorization requests wherein a registration of the secondary client system with the system for providing transaction authorization includes:
    communicate a public key to the one or more transaction systems such that the one or more transaction systems verify cryptographic validity of the public key using a hash, the public key and a corresponding private key being generated on the secondary client system, and
    registering the secondary client system based on the one or more transaction systems verifying the cryptographic validity of the public key;
communicate an authorization request to the secondary client system based on the request to approve the transaction, wherein the authorization request includes the nonce;
receive a response to the authorization request from the secondary client system based on the request to approve the transaction, wherein the response is received in response to a comparison of a first visual representation of the nonce displayed at the primary client system with a second visual representation of the nonce displayed at the secondary client system, wherein the first visual representation of the nonce is generated by the one or more transaction systems and transmitted to the primary client system along representation of the nonce is generated by the secondary client system; and
    communicate the response to the authorization request to the one or more transaction systems for a verification that the response to the authorization request includes the nonce and authorization information both cryptographically signed by the private key corresponding to the public key previously communicated to the one or more transaction systems, wherein the private key is associated with the secondary client system.

19. The system of claim 18 wherein the transaction comprises a login transaction wherein a user supplies a username and password to the transaction system.

20. The system of claim 18 wherein the transaction comprises a financial transaction wherein a credit card or debit card of a user is swiped in a processing terminal of a merchant.

21. The system of claim 18 wherein the transaction comprises an online financial transaction.

* * * * *

UNITED STATES PATENT AND TRADEMARK OFFICE
CERTIFICATE OF CORRECTION

| | | |
|---|---|---|
| PATENT NO. | : 10,013,692 B2 | Page 1 of 1 |
| APPLICATION NO. | : 13/674291 | |
| DATED | : July 3, 2018 | |
| INVENTOR(S) | : Matt Hubert et al. | |

It is certified that error appears in the above-identified patent and that said Letters Patent is hereby corrected as shown below:

In the Claims

Column 22, at beginning of Line 4 insert -- with the nonce by the one or more transaction systems, wherein the second visual --

Signed and Sealed this
Twenty-first Day of August, 2018

Andrei Iancu
*Director of the United States Patent and Trademark Office*